Feb. 17, 1948.　　　N. W. RICHARDS　　　2,436,152
PORTABLE FLANGE SERRATING TOOL
Filed March 3, 1945　　　2 Sheets-Sheet 1

Inventor
NORVIN W. RICHARDS

By Clarence A. O'Brien
and Harvey B. Jackson
Attorneys

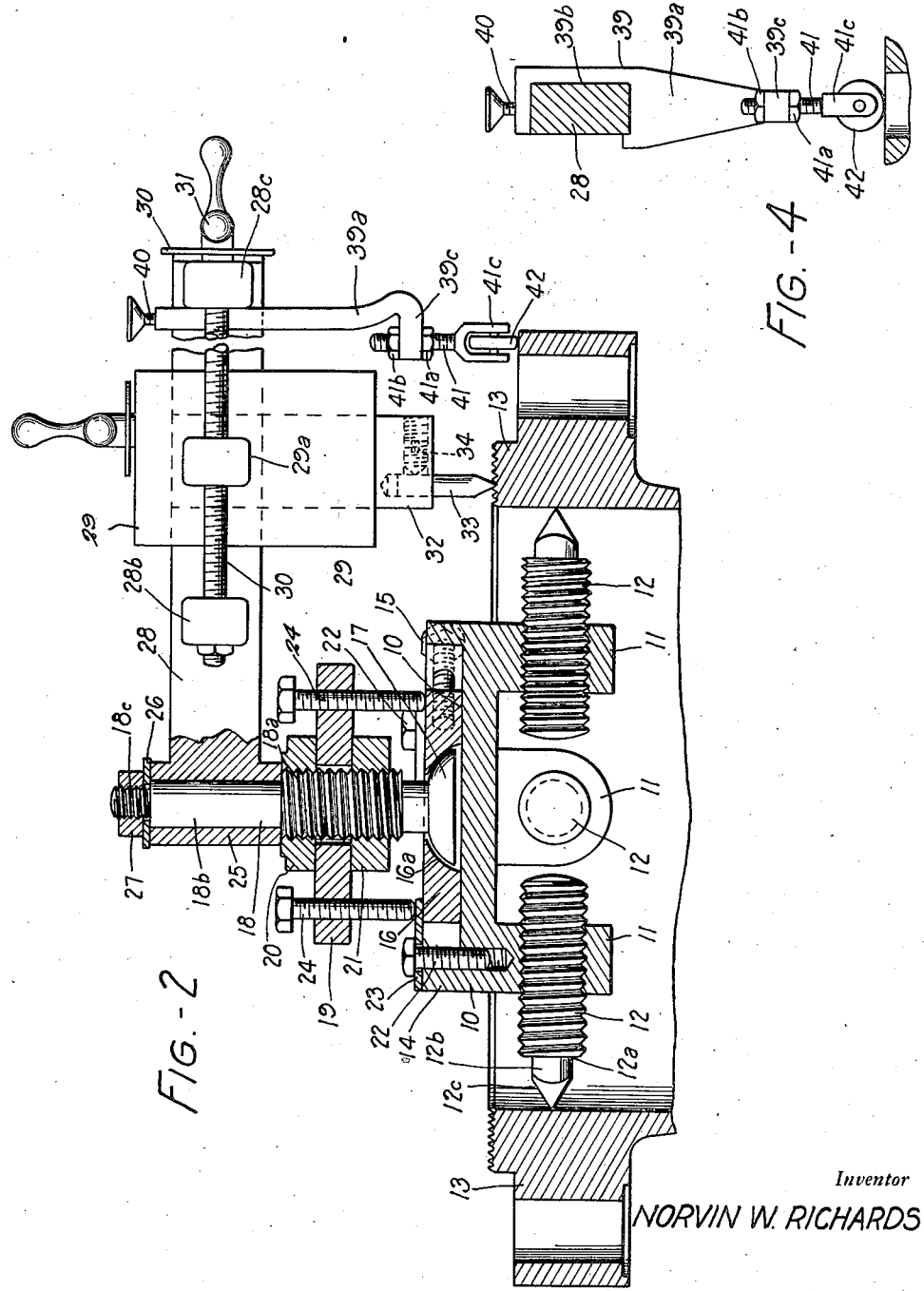

Patented Feb. 17, 1948

2,436,152

UNITED STATES PATENT OFFICE 2,436,152

PORTABLE FLANGE SERRATING TOOL

Norvin W. Richards, Brilliant, Ohio

Application March 3, 1945, Serial No. 580,768

1 Claim. (Cl. 82—4)

This invention relates to a machine for forming concentric grooves to provide concentric ribs or serrations in pipe flanges, which have been bruised in shipment or by handling, or cut in service by steam, water or other flowing materials, and which have been repaired by deposit welding to provide a filling to build up material lost or displaced by the bruising or cutting.

One of the objects of the invention is to provide a portable machine or cutting tool, which may be secured in concentric relation to the pipe flange, and which can be operated by hand to cut concentric grooves in the meeting face of the flange.

Another object of the invention is the provision of a portable machine or tool for this general purpose, with means for making a precision adjustment of the tool holder, so that it will cut a concentric groove of uniform depth in the meeting face of the flange.

With the above and other objects in view the invention consists in certain new and useful constructions, combinations and arrangements of parts, clearly described in the following specification, and fully illustrated in the accompanying drawings, in which—

Figure 2 is a vertical sectional view, taken on line 2—2 of Figure 1, looking in the direction of the arrows.

Figure 4 is a detail vertical sectional view of a roller guide, taken on line 4—4 of Figure 1, looking in the direction of the arrows.

Figure 1:
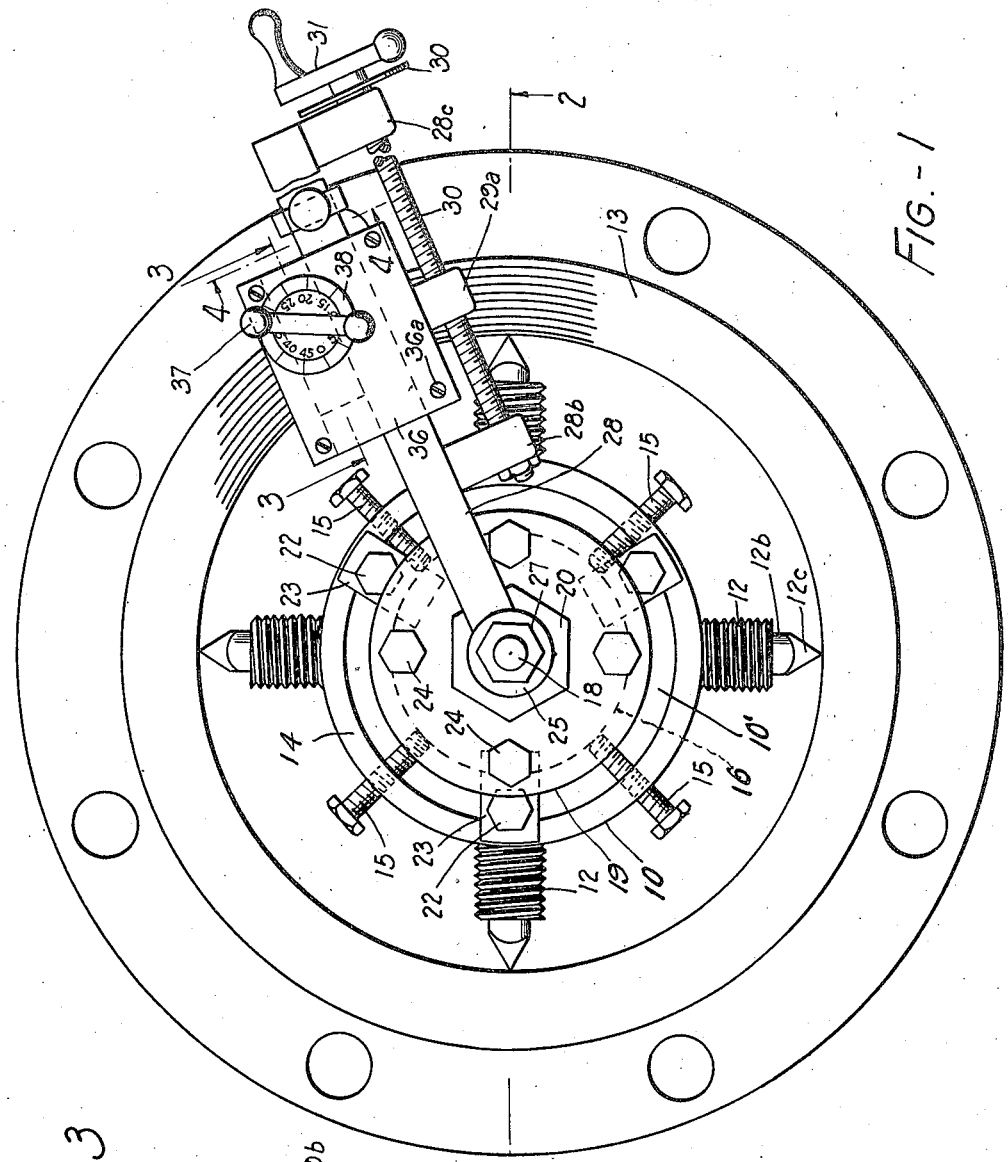
Figure 1 is a top plan view.

Referring to the accompanying drawings which illustrate a practical embodiment of my invention, 10 designates a metal base, which is constructed with a plurality of integral lugs 11, shown to be four in number and arranged in radial relation on the bottom side of the base, and spaced equal distances from each other. A clamping screw 12 is threaded through a tapped hole formed in each lug, and is provided with a reduced outer end 12a, which is shown to be formed with flat wrench gripping faces 12b, and to be also formed with a tapered outer end 12c, which is designed to have clamping engagement with the internal surface of the pipe or member, having the concentric coupling flange 13.

The clamping screws 12 are adjusted so that the tapered outer ends thereof will grip the inner wall surface of the tubular member which carries the coupling flange 13, so as to support the base in as nearly concentric relation as is possible with reference to the bore of the member and the coupling flange.

The base 10 is also formed with an upstanding concentric flange 14 and a plurality of screws 15 are threaded through this flange, in radial relation thereto, and spaced equal distances from each other, and with their inner and clamping ends projecting toward the center of the base. On the flat upper surface 10' of the base 10 a flat retaining ring 16 is disposed, and this ring is clamped in concentric relation to the bore of the member which carries the coupling flange 13, as nearly as can be arranged by rough eye determination.

The retaining ring 16 is formed with a concentric concave socket 16a, which opens through the upper surface of the ring, and the ring is positioned on the base 10 so that the smaller open end of this socket will be uppermost. Seated in the socket 16a is a semi-spherical head 17 forming the base of a vertical post 18, which is provided with a shank having a large externally threaded portion 18a, an unthreaded cylindrical portion 18b above this threaded portion, and a reduced upper end which is formed with screw threads 18c.

A ring 19 encircles the threaded portion 18a of the post 18 and is clamped in place thereon by means of the two nuts 20 and 21, which engage the threaded portion 18a and grip opposite sides of the ring.

In addition to the clamping effect obtained on the retaining ring 16 by the horizontal screws 15, a plurality of vertical screws 22 are threaded into the base 10, and their heads engage the clamp plates 23, which engage the top surface of the ring 16 near its periphery, so as to firmly clamp this ring on the base independently of the clamping effect obtained by the horizontal screws 15. By slightly releasing the vertical screws 22 concentricity of the ring 16 may be attained by means of the screws 15. When the desired adjustment has been completed the screws 15 and the screws 22 are tightened to desired clamping pressure.

The ring 19 is equipped with a plurality of vertical screws 24, which either engage the upper surface of the socket ring or plate 16, or one of the clamp plates 23, should the lower end of the screw nearest to any clamp plate fall in line with it. By adjusting these screws relative to each other the axial position of the vertical post may be regulated, so that it can be finally brought into precise axial alignment with the axis of the flange.

Rotatably mounted on the portion 18b of the post 18 and bearing on the upper end of the unit 20 is a sleeve 25 carrying an arm 28 which is provided with laterally extending sockets 28b and 28c in which an externally threaded rod or shaft 30 is journalled. Slidably mounted on the arm 28 between the sockets 28b and 28c is a carriage 29 having a laterally projecting internally screw threaded lug 29a through which the shaft 30 extends. A handle 31 is fixed to the outer end of the shaft 30 so that the shaft may be rotated to adjust the position of the carriage 29 on the arm 28 and a suitable index plate 30' may be arranged on said shaft to turn therewith.

Figure 3:
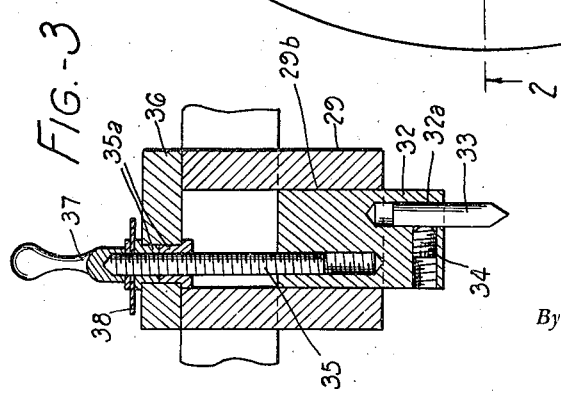
Figure 3 is a detail vertical sectional view through the tool holder, taken on line 3—3 of Figure 1, looking in the direction of the arrows.

The carriage 29 is provided with a large socket 29b (Fig. 3) which receives the tool holding chuck 32, and this chuck is provided with a socket 32a which receives the tool bit 33. This bit is clamped in place in its socket by means of the set screw 34, threaded across the chuck.

The tool chuck and its tool bit are adjusted vertically in the socket 29b by means of a screw shaft 35, which is threaded through the top plate 36 of the carriage, this plate being held in place by the screws 36a. The screw shaft works directly through internally threaded bushings 35a carried by the top plate 36. On the upper end of the screw shaft 35 is a balanced handle 37 is mounted, and under this handle the index disc 38 is arranged, so as to turn with the screw shaft. The screw shaft is arranged to operate to one side of the horizontal bar or arm 28.

When the tool bit is in physical contact with the upper surface of the concentric flange it provides some support for the horizontal bar or arm 28 and the tool holder, but in addition to this support it is necessary to provide the guide 39, which is formed with a standard 39a having a lateral slot 39b therein, which receives the horizontal bar or arm 28. The upper end of the standard 39a is clamped on the bar or arm 28 by means of the thumb screw 40. The lower end of this standard 39a is provided with a horizontally disposed lug 39c which carries the vertical screw shaft 41, which is clamped thereto by means of the nuts 41a and 41b. The lower end of the screw shaft 41 is formed integral with the U-shaped member 41c, in which the roller 42 is mounted to turn. This roller is designed to roll around the outer marginal edge of the concentric flange, which is normally located on a different horizontal plane from the surface which carries the concentric ribs or serrations. The roller is adjusted by means of its screw shaft 41. The upper end of the standard 39a is clamped to the bar or arm 28 near the outermost socket 28c thereof, so as to be out of the way of the carriage 29.

In using the device the bruised or cut flange is first built up by deposit welding, and then the base 10 is clamped in the work as nearly concentric as the eye can determine. The central post 28 is then adjusted by operating the leveling screws 24 and the radial screws 15, so that the axis of the post aligns with the axis of the work. The horizontal arm or bar 28 is then swung around and the distance from the point of the tool bit with reference to the circumference of the flange is checked and such further adjustment is made as may be required accurately to align the tool with the work. Final and accurate adjustments for concentricity having been made by adjustment of opposite pairs of screws 15 the clamps 23 are tightened to lock the parts in place. All other adjustments are checked to provide that the tool bit will swing in true concentric relation to the flange, and will engrave or cut into the upper surface of the flange a uniform distance, as the tool holder and its swinging arm are swung around by manual effort. The depth of adjustment of the tool chuck may be checked by its index disc or plate, and the tool bit may be raised or lowered to regulate the depth of cut made by it as it is being swung around the circle. When one groove is formed then the carriage may be shifted on the swinging arm or bar, so that another groove may be cut. In this way the operation is continued until the required number of grooves are formed in the upper face of the flange, which will leave a series of concentric ribs or serrations on the meeting face of the flange.

If necessary the flange may be ground to level it after an excessive deposit made in welding, before the cutting is started.

It is necessary that work of this character be completed with the greatest precision, and my improved flange facing tool provides the means for producing a series of concentric grooves and serrations, which will lie in true concentricity with relation to the axis of the flange, which will be of equal depth, and which will provide the required concentric ribs or serrations for making an effective joint coupling of the flange.

It is understood that various changes in the details of construction, their combination and arrangement, may be made within the scope of the claims of this application.

Having described my invention, I claim as new:

A flange cutting tool, comprising a base, a plurality of screws mounted for radial adjustment on the base and provided with tapered outer ends adapted to have clamping engagement with the bore wall of a member having a concentric flange, a socket plate disposed on the base, means for adjusting the socket plate with reference to the base, means for clamping the socket plate, a post having a head having a bearing between the socket plate and the base and adapted to be clamped with the socket plate to the base, screws mounted to turn on the post and arranged to engage the base for adjusting the axial relation of the post to the axis of the bore wall engaged by it, an arm arranged to bear against the post at one end and provided with a tool adapted to cut a concentric groove in the outer face of the engaged flange.

NORVIN W. RICHARDS.

REFERENCES CITED

The following references are of record in the file of this patent:

UNITED STATES PATENTS

| Number | Name | Date |
|---|---|---|
| 145,103 | Henderson et al. | Dec. 2, 1873 |
| 1,747,944 | Lyne | Feb. 18, 1930 |
| 1,990,270 | Denke et al. | Feb. 5, 1935 |
| 2,011,940 | Myers | Aug. 20, 1935 |
| 2,211,134 | Kruell | Aug. 13, 1940 |
| 1,787,871 | Moen | Jan. 6, 1931 |
| 2,297,074 | Rohrdanz | Sept. 29, 1942 |
| 598,662 | Huxley | Feb. 8, 1898 |
| 1,452,320 | Staempfli | Apr. 17, 1923 |
| 1,836,078 | Litter | Dec. 15, 1931 |

FOREIGN PATENTS

| Number | Country | Date |
|---|---|---|
| 58,550 | Austria | Apr. 10, 1913 |